UNITED STATES PATENT OFFICE.

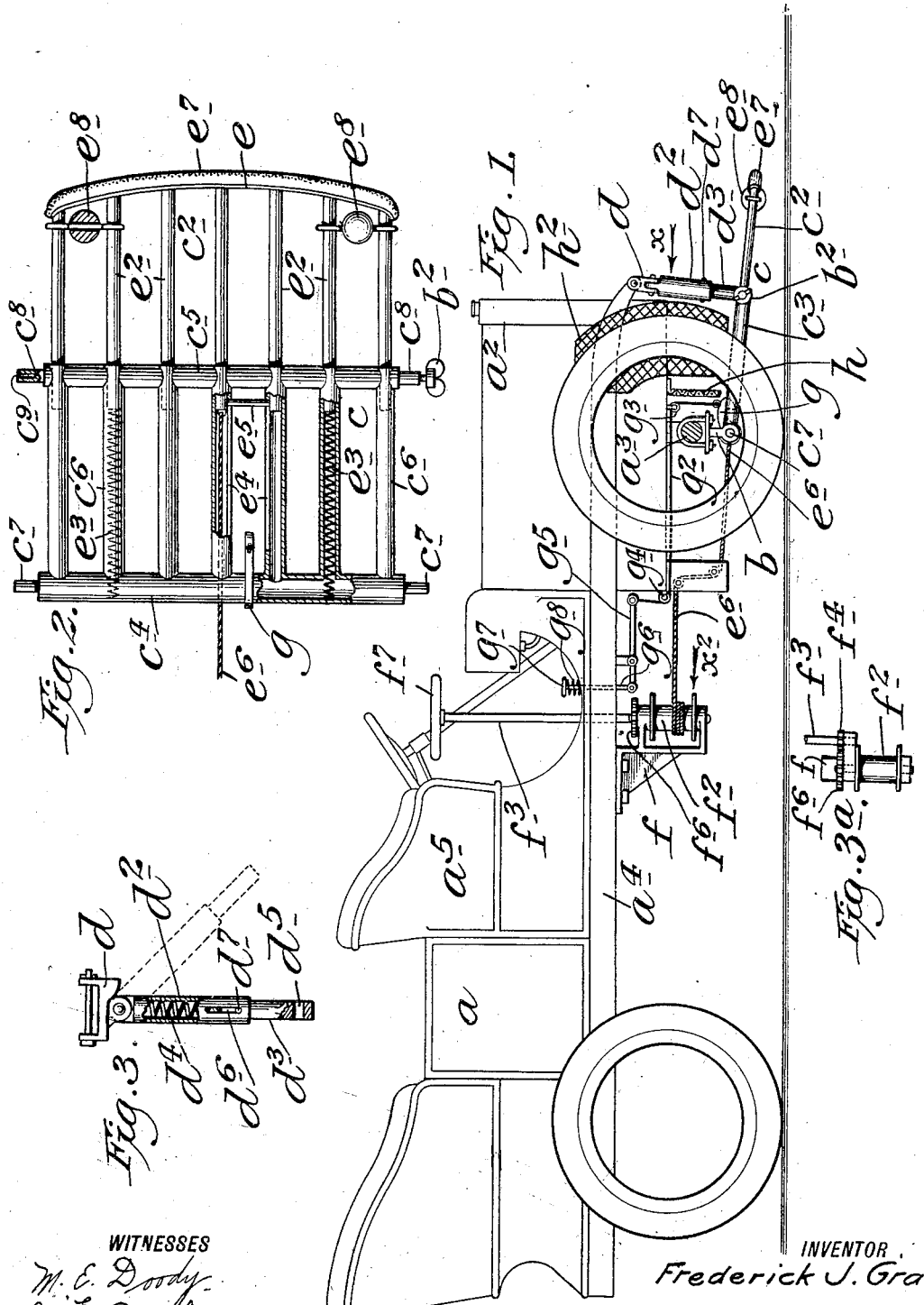

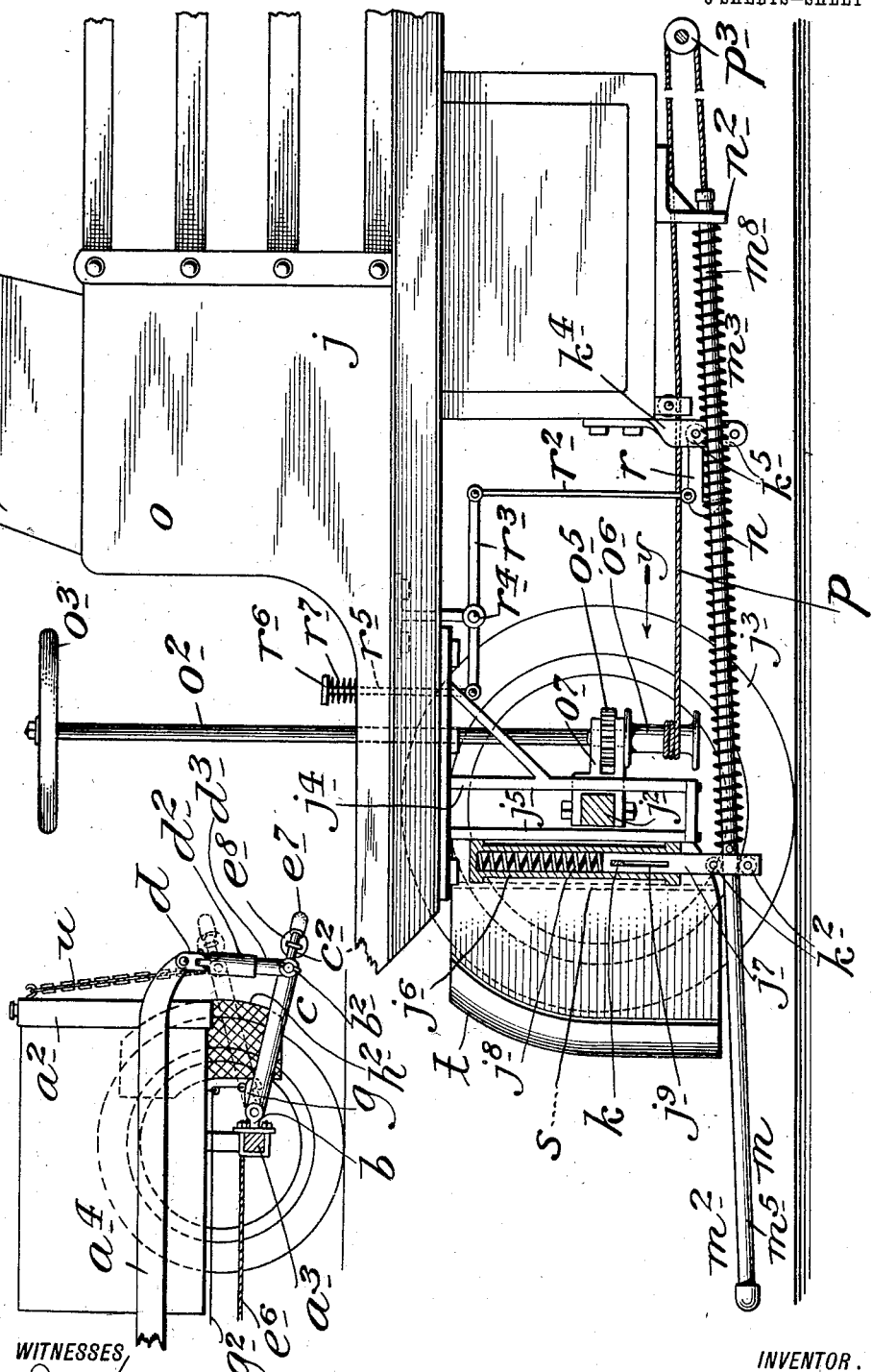

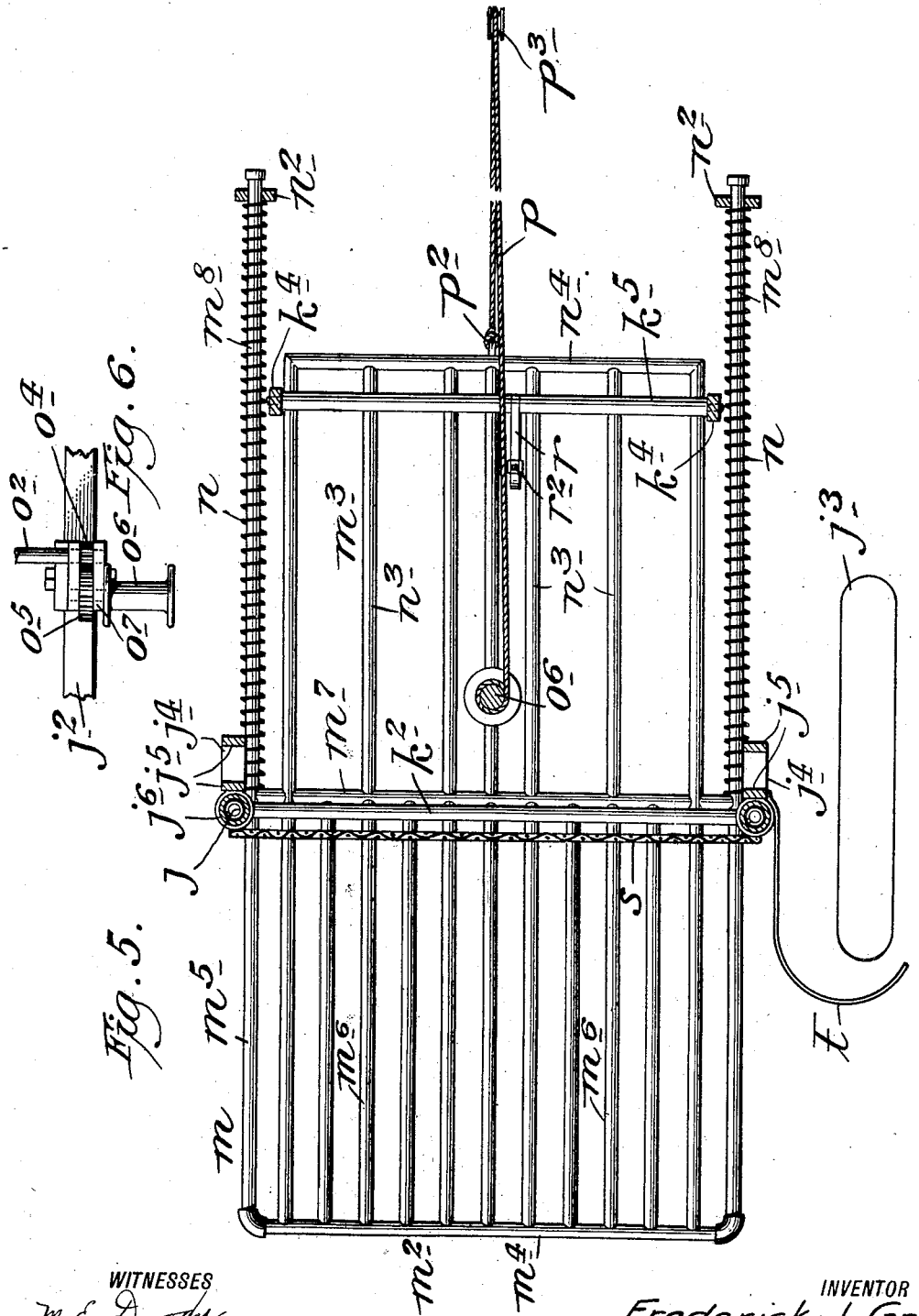

FREDERICK J. GRAF, OF NEW YORK, N. Y.

SAFETY FENDER OR GUARD FOR AUTOMOBILES AND OTHER VEHICLES.

No. 908,561.　　　Specification of Letters Patent.　　　Patented Jan. 5, 1909.

Application filed May 20, 1908. Serial No. 433,830.

*To all whom it may concern:*

Be it known that I, FREDERICK J. GRAF, a citizen of the United States, and residing at New York, in the county of New York and State of New York, have invented certain new and useful Improvements in Safety Fenders or Guards for Automobiles and other Vehicles, of which the following is a specification, such as will enable those skilled in the art to which it appertains to make and use the same.

This invention relates to safety fenders or guards for use in connection with automobiles and other motor vehicles such as tramway cars and the like; and the object thereof is to provide an improved device or apparatus of this class which will prevent the serious and frequently fatal accidents resulting from a person being struck by an automobile or other vehicle, and with this and other objects in view the invention consists in an apparatus of the class specified constructed as hereinafter described and claimed.

My invention involves a fender or guard frame normally held in a retracted position beneath the front end portion of the vehicle body and adapted to be projected by springs or other tensional devices, said frame being also adapted to be withdrawn beneath the front end portion of the vehicle body by a cable connected therewith and passing over suitably supported pulleys and connected with a drum supported beneath the vehicle body and having operating devices under the control of the motorman or operator of the car, and devices for holding said frame in its retracted or withdrawn position and also under the control of the motorman or operator, said frame being also provided with vertically movable spring depressed supports whereby it is capable under certain circumstances of a slight vertical movement.

The invention is fully disclosed in the following specification, of which the accompanying drawings form a part, in which the separate parts of my improvement are designated by suitable reference characters in each of the views, and in which:—

Figure 1 is a side view of an automobile provided with my improved fender or guard, part of the construction being in section, Fig. 1ª a view similar to Fig. 1 but showing only part of the construction shown in Fig. 1, and showing a modification thereof, Fig. 2 a sectional plan view of the main part of the fender or guard detached, Fig. 3 a sectional view of a detail of the construction shown in Fig. 1, and looking in the direction of the arrow $x$, Fig. 3ª a front view of a detail of the construction shown in Fig. 1, and looking in the direction of the arrow $x^2$, Fig. 4 a view similar to Fig. 1 but showing a modification, Fig. 5 a plan view of the main part of the fender or guard shown in Fig. 4 but showing the same detached and part of the construction in section, and;—Fig. 6 a detail of the construction shown in Fig. 4, and looking in the direction of the arrow $y$.

In Fig. 1 of the accompanying drawings, I have shown at $a$ an ordinary automobile provided with the usual "cooler" $a^2$ below which is the usual front axle $a^3$ with which are connected hangers $b$ between which is pivoted the operative part $c$ of my improved fender or guard as shown in Figs. 1 to 3 inclusive.

The operative part $c$ of my improved fender or guard as shown in Figs. 1 to 3 inclusive consists of a front forwardly and backwardly movable frame $c^2$ and a rear frame $c^3$. The rear frame $c^3$ comprises a transverse rear end member $c^4$ preferably tubular in form, and a front transverse member $c^5$, said members being connected by parallel tubular members $c^6$, and the transverse rear member $c^4$ is provided with end trunnions $c^7$ mounted in the hangers $b$, and the front transverse member $c^5$ is provided with end trunnions $c^8$ having screw threaded bores $c^9$ adapted to receive screws $b^2$.

The side frame members $a^4$ of the main truck or frame work of the automobile are provided at their front ends with pivoted hangers $d$ with which are pivotally connected sleeves $d^2$ in the lower ends of which are placed plungers $d^3$, and in the sleeves $d^2$ are placed spiral springs $d^4$ which bear on the plungers $d^3$, and the trunnions $c^8$ of the transverse member $c^5$ of the fender or guard frame $c$ pass through the lower ends of the plungers $d^3$ at $d^5$, and the sleeves $d^2$ are provided in the opposite sides thereof with slots $d^6$ through which are passed pins $d^7$ connected with the plungers $d^3$, and said pins limit the movement of the plungers $d^3$ in the sleeves $d^2$.

The forwardly and backwardly movable part $c^2$ of the frame $c$ constitutes the fender or guard proper and is composed of a transverse front member $e$ with which are connected parallel rods $e^2$ which enter and are movable in the parallel tubular members $c^6$ of the frame members $c^3$, these parts being telescopic in form and operation, and two or more of the parallel tubular members $c^6$ in the rear part of the frame $c$ are provided with spiral springs $e^3$ which bear on the ends of the corresponding rods $e$ and normally serve to force the fender or guard frame member $c^2$ outwardly or forwardly into the position shown in Figs. 1 and 2.

Two of the central parallel tubular members $c^6$ of the rear part $c^3$ of the frame $c$ are provided in their adjacent sides with longitudinal slots $e^4$, and the rods $e^2$ of the front frame member $c^2$ which pass into said tubular members $c^6$ are connected by a rod or bar $e^5$ movable through the slots $e^4$, and passing into the central tubular member $c^6$ is a cable $e^6$ which is connected with the corresponding rod $e^2$ of the frame member $c^2$ as shown in Fig. 2.

The front transverse member $e$ of the guard frame member $c^2$ is provided with a cushion $e^7$ of any preferred material, and the front portion of said guard frame member is also provided with wheels or rollers $e^8$ which are adapted to bear on the ground under certain conditions, or when the fender or guard frame is depressed by the movement of the vehicle or in any other way.

At a suitable point and preferably centrally of and below the frame work of the vehicle, and also preferably beneath or in front of the seat $a^5$ is placed a bracket or support $f$ in which is mounted a drum $f^2$ with which the cable $e^6$ is connected, and in the form of construction shown, I provide a rod $f^3$ for operating the drum $f^2$, said rod being mounted vertically over the drum $f^2$ and passing through the bottom of the vehicle in the front of the seat $a^5$. The rod $f^3$ is provided with a pinion $f^4$ at its lower end which meshes with a gear wheel $f^6$ on the shaft or axle of the drum $f^2$, and the rod $f^3$ is also provided at the upper end thereof with a wheel $f^7$ by which it may be operated, and by means of the said rod the drum $f^2$ may be turned so as to wind the cable $e^6$ thereon, and withdraw the fender or guard frame member $c^2$ beneath the front end portion of the vehicle, in which operation the rods $e^2$ are telescoped in the parallel tubular members $c^6$ and against the operation of the springs $e^3$.

Mounted centrally of the transverse member $c^4$ of the part $c^3$ of the fender or guard frame $c$ is a dog $g$ adapted to engage the cross rod or bar $e^5$ when the frame or member $c^2$ is drawn backwardly as above described, and connected with the dog $g$ is a cord $g^2$ which is passed over or around pulleys $g^3$ and $g^4$ and connected with one end of a lever $g^5$ with the other end of which is connected a rod $g^6$ which passes upwardly through the floor or bottom frame work of the vehicle in front of the seat $a^5$ and is provided at its upper end with a head $g^7$ below which is placed a spring $g^8$. The spring $g^8$ normally serves to hold the lever $g^5$ in the position shown in Fig. 1, in which position the dog $g$ will be in proper position to engage the rod or bar $e^5$ and hold the fender or guard frame member $c^2$ in its withdrawn or telescoped position, and whenever there is danger of the vehicle striking a person or object pressure is applied to the head $g^7$ of the rod $g^6$ and the dog $g$ is raised and disengaged from the rod or bar $e^5$ and the fender or guard frame or member $c^2$ is projected by the springs $e^3$ and the person or object struck will fall thereon and will be prevented from passing backwardly under the vehicle. I also place transversely of and beneath the "cooler" $a^2$ or between said "cooler" and the rear part of the fender or guard $c$ a supplemental guard $h$ composed of open wire work or any other suitable material, and the said supplemental guard $h$ may be constructed and supported in any desired manner, and this also aids in preventing a person or object from passing back under or beneath the vehicle and from coming in contact with the front axle $a^3$. The wheels $a^6$ of the front axle are also provided with shields $h^2$ which may be secured to the frame work or truck work of the vehicle in any desired manner, and which serve to prevent a person or object struck as above described from coming in contact with said wheels.

The operation of this apparatus, as described, and as shown in Figs. 1 to 3 inclusive is as follows: Under normal conditions the cable $e^6$ is wound on the drum $f^2$ and the front part of the main fender or guard $c$ is drawn back until the transverse part $e$—$e^7$ thereof is closely adjacent to the transverse member $c^5$ with which the front ends of the tubes $c^6$ are connected, and also closely adjacent to and beneath the front end of the "cooler" $a^2$, and in this position of the parts said front end portion of the main fender or guard frame is drawn out of the way and does not interfere with the operation of the vehicle. In this position of the parts the dog $g$ is also in engagement with the transverse rod or bar $e^5$, and if at any time an accident is imminent or there is danger of the vehicle striking a person or object pressure is applied to the rod $g^6$, the dog $g$ is raised and the front part of the main fender or guard frame is projected by the springs $e^3$ and the person or object struck will be caught on or will fall on said part of the fender or guard frame and will be prevented from passing beneath the vehicle.

There is considerable space between the bottom of the "cooler" $a^2$ and the rear part of the main fender or guard frame, and a person or object struck might pass backwardly beneath the front end portion of the "cooler" or partially so and might come in contact with the front axle, or with the front wheels of the vehicle, but the supplemental fender $h$ and the shields $h^2$ will prevent this result.

In the construction shown in Figs. 4 to 6 inclusive, I have shown a modification of my improved fender or guard frame. In Fig. 4 of the drawings, I have shown at $j$ the front part of an automobile, and at $j^2$ the front axle provided with the usual wheels $j^3$, one of which is shown, and in practice I secure to the opposite sides of the body or truck frame of the vehicle vertically arranged brackets or supports $j^4$ preferably provided with vertically arranged and parallel parts $j^5$ between which the axle $j^2$ is placed, and connected with the front part of the brackets or supports $j^4$ are vertically arranged sleeves or casings $j^6$ in the lower end portions of which are placed plungers $j^7$, and the sleeves or casings $j^6$ are provided with spiral springs $j^8$ which normally serve to depress the plungers $j^7$, and said plungers are provided with longitudinal slots $j^9$ through which are passed pins $k$ which are secured in the sleeves or casings $j^6$ and limit the movement of the plungers $j^7$.

The lower end portions of the plungers $j^7$ are provided with rollers $k^2$ which extend transversely beneath the front portion of the truck frame of the vehicle, and secured to the battery frame or casing $k^3$, in the form of construction shown, are hangers $k^4$ in which are mounted two other parallel rollers $k^5$ similar to the rollers $k^2$ and which extend from one of the hangers $k^4$ to the other transversely of and beneath the body of the vehicle. I also provide a main fender or guard frame $m$ shown in detail in Fig. 5 and a side view of which is given in Fig. 4, and said main fender or guard frame is composed of a front portion $m^2$ and a rear portion $m^3$, the front portion being composed of a front transverse rod $m^4$, side rods $m^5$ and intermediate parallel rods $m^6$ arranged closely adjacent and parallel with the side rods $m^5$, and the rear ends of the intermediate parallel rods $m^6$ are connected with a transverse bar $m^7$ with which the side rods $m^5$ are also connected, and the side rods $m^5$ are extended backwardly to form guide rods $m^8$ on which are mounted spiral springs $n$, and the front part $m^2$ of the fender or guard frame $m$ is movable between the rollers $k^2$ while the backwardly directed rods $m^8$ pass through hangers $n^2$ between which and the bar $m^7$ the springs $n$ are placed. The rear part $m^3$ of the fender or guard frame $m$ which is between the guide rods $m^8$ is made up of parallel rods $n^3$ connected with the transverse bar $m^7$, and a rear end transverse rod $n^4$, and this part of the fender or guard frame is movable between the rollers $k^5$ while the guide rods $m^8$ are outside of said rollers and outside of the hangers or supports $k^4$ in which said rollers are mounted.

Placed vertically and in front of the seat $o$ of the vehicle is a rod $o^2$ which passes downwardly through the bottom of the vehicle and is provided at its upper end with a ring or handle $o^3$, and said rod is provided at its lower end with a pinion $o^4$ as shown in Fig. 6 which meshes with a gear wheel $o^5$ on the shaft or axle of a drum $o^6$ supported in suitable bearings $o^7$ connected, in the form of construction shown, with the axle $j^2$, but which may be supported in any desired manner.

A cable $p$ is connected with the rear end of the fender or guard frame at $p^2$ and carried backwardly around a suitably supported pulley $p^3$ and then forwardly and connected with the drum $o^6$, and by turning the rod $o^2$ in the proper direction the main fender or guard frame may be drawn backwardly until the front end thereof is entirely beneath the front end portion of the vehicle body, and in this operation the springs $n$ are compressed as will be readily understood.

A dog $r$ is mounted on the top roller $k^5$, and when the fender or guard frame is drawn backwardly as above described, the said dog engages the transverse rod $m^7$ and holds said fender or guard frame in its retracted position beneath the body of the car, and connected with the dog $r$ is a rod $r^2$ which is connected with the rear end of a lever $r^3$ supported at $r^4$ and with the front end of which is connected a rod $r^5$ which passes up through the bottom of the body of the vehicle in front of the seat $o$, and the top end of which is provided with a head $r^6$ below which is placed a spring $r^7$ which normally holds the dog $r$ in a depressed position, and in order to release the dog from the transverse rod or bar $m^7$ of the fender or guard frame the rod $r^5$ is depressed and the springs $n$ at once operate to project the front end of the fender or guard frame as shown in Fig. 4.

In the normal position of the parts of this apparatus the springs $n$ are compressed and the fender or guard frame $m$ is drawn back until the front end thereof is beneath the body portion of the car, and the dog $r$ is in engagement with the transverse rod or bar $m^7$ of said fender or guard frame. If at any time, with the parts of the fender or guard in this position, and there is danger of striking a person or object, the rod $r^5$ is at once depressed by the operator of the vehicle, the dog $r$ is raised and the fender or guard frame projected as shown in Fig. 4, and the person or object if struck will fall onto said fender or guard frame and will be prevented from passing beneath the vehicle. I also preferably place in front of the front axle $j^2$ a vertically arranged supplemental fender $s$ consisting of an open work guard or screen composed of any desired material, and this supplemental guard will prevent a person or object when struck by or received on the fender or guard frame $m$ from passing backwardly to the front axle $j^2$ and over or under said axle. I also preferably connect with the front part of the truck or vehicle frame or with the supports or brackets $j^4$ wheel shields $t$ which will prevent a person or object from rolling off of the fender or guard frame, and coming in contact with the wheels $j^3$ of the front axle, said shields being similar to the shields $i$ shown in Fig. 1, and either of these shields may be of any desired construction and supported in any preferred manner.

The form of construction shown in Figs. 4 and 5 is best adapted for use in connection with tramway motor cars. The dog $g$ in the construction shown in Figs. 1 and 2 is rotatably mounted on the cross rod bar or member $c^4$ of the fender or guard frame, and in the construction shown in Figs. 4 and 5 the top roller $k^5$ is made of two parts mounted on a central shaft, and the dog $r$ is rotatably mounted on said shaft between the separate parts of said roller $k^5$.

In the different forms of construction shown and described the dogs $r$ and $g$ which hold the movable fender or guard frame in its withdrawn or rearmost position are operated by a vertical movable rod or bar passing through the bottom of the frame work of the car in order to release the said movable guard frame and allow it to be projected, but other forms of apparatus or devices may be provided for operating or releasing said dogs, said apparatus or devices being under the control of the operator of the vehicle.

In Fig. 1$^a$ I have shown a slight modification of the construction shown in Figs. 1 to 3 inclusive in which the movable part $c^2$ of the fender or guard frame $c$ is shown in its withdrawn position, and in which the said fender or guard frame is pivoted or hinged to the front of the axle $a^3$, and I also provide a chain or similar device $u$ by which the fender or guard frame may be raised and supported as shown in dotted lines in Fig. 1$^a$, this construction being particularly adapted for use in the country where the roads are rough and uneven and where there is no danger of striking a person when the vehicle is in motion. In this operation the screws $b^2$ are detached, the plungers $d^3$ are disconnected from the fender or guard frame, and the chain $u$ is connected therewith. It will also be seen that in the construction shown in Fig. 1 of the drawing the fender or guard frame is supported beneath the axle $a^3$ but under ordinary circumstances it will be necessary to pivot the fender or guard frame in front of the axle $a^3$ as shown in Fig. 1$^a$, as there is not enough room between said axle and the road surface under ordinary conditions, and when the form of construction shown in Fig. 1$^a$ is employed the supplemental fender or guard $h$ shown in Fig. 1 will not be necessary.

My invention is not limited to the details of the construction of the fender or guard frames $c$ and $m$, nor to the particular means herein shown and described for operating or withdrawing beneath the front part of the vehicle the said frames or the movable parts thereof, and if desired an electric or other motor may be provided for this purpose, and various changes in and modifications of these features of construction, as well as other parts of the apparatus may be made, within the scope of the appended claims, without departing from the spirit of my invention or sacrificing its advantages, and I reserve the right to make all such alterations therein as fairly come within the scope of the invention.

My improved fender or guard apparatus in either form of construction shown is well adapted to accomplish the result desired, and while I have shown the same applied to an automobile, my invention is not limited to this use thereof, and the same may be applied to vehicles of other kinds or classes and to tramway cars if desired.

Having fully described my invention, what I claim as new and desire to secure by Letters Patent, is;—

1. A fender or guard for automobiles, motor street cars and like vehicles, comprising a frame supported beneath one end of the vehicle, said frame being adapted to swing vertically and to be projected forwardly of and withdrawn beneath the vehicle, vertically movable spring depressed devices for supporting said frame, tensional devices for projecting said frame, devices for withdrawing said frame comprising a drum supported beneath the body of the vehicle and provided with a rod which passes upwardly through the bottom thereof, and a cable connected with said drum and said frame, a locking device for holding said frame in its withdrawn position, and a spring supported bolt passing through the bottom of the vehicle and in operative connection with said locking device for releasing said frame.

2. A fender or guard for motor cars and similar vehicles, comprising a frame supported beneath one end of the vehicle, said frame being adapted to swing vertically, vertically movable spring depressed devices for supporting said frame, a supplemental frame slidably connected with the first named frame and adapted to be projected forwardly of the vehicle, tensional devices for projecting the supplemental frame, devices for withdrawing the supplemental frame comprising a drum supported beneath the vehicle, a cable connected therewith and with the supplemental frame, and a rod connected with said drum and passing up through the bottom of the vehicle and by which said drum may be turned so as to wind said cable thereon, a locking device for holding the supplemental frame in a withdrawn position, and devices operated from the body of the vehicle to release said locking device.

3. A fender or guard for motor cars and similar vehicles, comprising a frame supported beneath one end of the vehicle, said frame being adapted to swing vertically, vertically movable devices for supporting said frame, a supplemental frame slidably connected with the first named frame and adapted to be projected forwardly of the vehicle, tensional devices for projecting the supplemental frame, devices for withdrawing the supplemental frame comprising a drum supported beneath the vehicle, a cable connected therewith and with the supplemental frame, and a rod connected with said drum and passing up through the bottom of the vehicle and by which said drum may be turned so as to wind said cable thereon, a locking device for holding the supplemental frame in a withdrawn position, devices operated from the body of the vehicle to release said locking device, wheel guards supported at the opposite sides of the first named frame, and a supplemental transverse guard mounted between said frame and the body portion of the vehicle.

In testimony that I claim the foregoing as my invention I have signed my name in presence of the subscribing witnesses this 16th day of May 1908.

FREDERICK J. GRAF.

Witnesses:
M. E. DOODY,
C. E. MULREANY.